May 9, 1933.  S. JENCICK  1,907,824

HYDRAULIC SHOCK ABSORBER

Filed Feb. 9, 1928

STEPHEN JENCICK  INVENTOR

BY

*Milburn ad Milburn* ATTORNEYS

Patented May 9, 1933

1,907,824

UNITED STATES PATENT OFFICE

STEPHEN JENCICK, OF CHAGRIN FALLS, OHIO

HYDRAULIC SHOCK ABSORBER

Application filed February 9, 1928. Serial No. 253,132.

This invention relates to an improved form of hydraulic shock absorber for use upon an automobile or the like.

The object of the present invention is to provide an efficient form of hydraulic shock absorber which is comparatively inexpensive and which may accordingly be installed as standard equipment upon the less expensive grades of automobiles.

Another object is to provide such a device which may be constructed of metal stampings and in which the cost of manufacture may thereby be reduced to a minimum.

Another object consists in devising a shock absorber of this type in which the fluid is compressed between curved surfaces which are adapted for relative back and forth movement toward and from each other by means of a rotatably operated member, thereby increasing the head of the fluid compression for a given movement of the rotatable arm.

A still further object is to devise such an arrangement in which the compression will be effected on both sides of a reciprocating plunger and in which a restricted communicating passage is provided between the oppositely disposed chambers.

Other objects consist in the provision of means for varying the cross-section of the restricted passage between the fluid compression chambers and also in the provision of a one-way connection between one of the fluid chambers and a fluid reservoir whereby the supply of fluid in the chambers may be automatically maintained.

Other objects will appear from the following description and claims when considered together with the accompanying drawing.

Figures 1, 3:
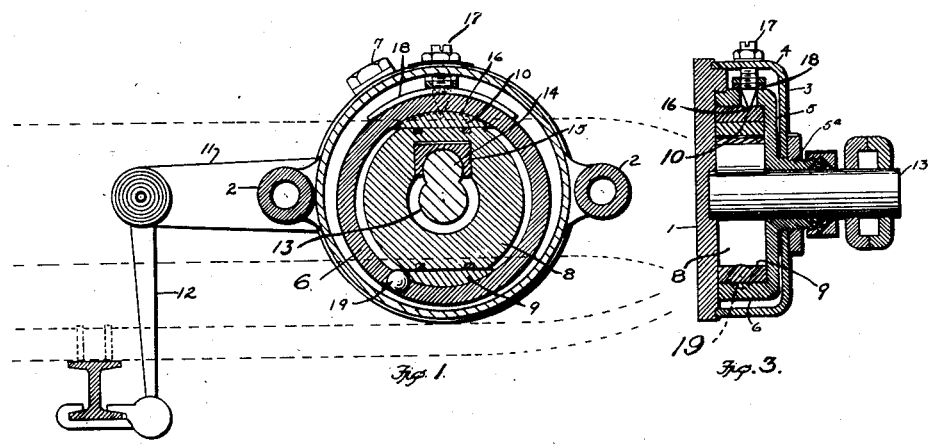
Figure 2:
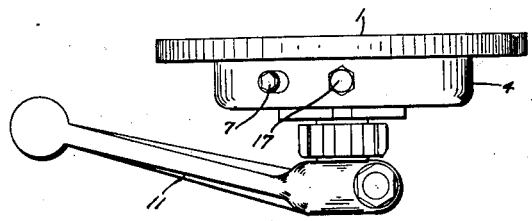

Fig. 1 is a view showing the casing of my improved device in vertical section; Fig. 2 is a plan view; and Fig. 3 is a sectional view taken at right angles to Fig. 1.

The metal plate 1 is adapted to be secured through the bolt holes 2 to the chassis of an automobile or other vehicle, this plate forming the back wall of the outer and inner casings. The outer casing comprises the end wall 3, and the side wall 4, this casing being of cylindrical form and having its open side secured to the plate 1. The inner casing comprises the end wall 5 and the side cylindrical wall 6 which is also secured to the plate 1. The space between the inner and outer casings serves as a reservoir for the fluid, such as oil, which is to serve as the medium of compression in the operation of this device. The oil or other fluid may be supplied to the casing by removal of the screw-cap or plug 7. The plunger 8 is adapted for sliding movement back and forth along a straight-line within the inner casing which has spot-welded thereto the segmental shaped members 9 and 10 which afford slide-ways for the plunger. Such sliding or straight-line motion of the plunger 8 is effected by means of the arm 11 which has its free end pivotally connected to the upright connecting rod 12, the lower end of which is fixedly mounted upon the axle of the automobile. The other end of the arm 11 is fixedly mounted upon the shaft 13 which extends into the inner casing and is provided with the eccentrically arranged ball member 14 which engages in a correspondingly formed socket in the block 15 which in turn is secured within the plunger 8. By this form of mechanism, the relative rotatable movement between the shaft 13 and casing causes straight-line movement of the plunger 8 by virtue of the ball and socket connection just now referred to. The extreme inner end of the shaft 13 is mounted in the plate 1 as a bearing therefor. Suitable packing and gaskets are provided for the several joints between the casings and the shaft so as to prevent escape of the liquid, as will be readily understood. The inner casing is provided with the neck portion 5ª through which extends the shaft 13.

The ends of the plunger 8 are of curved form corresponding approximately to the degree of curvature of the inner surface of the casing; although, as indicated in the drawing, the fluid chambers are restricted toward the upper and lower portions thereof. These compression chambers are provided with a restricted communicating channel indicated by reference numeral 16 which is of substantially V-shape in cross-section and which is formed in the outer surface of the slide member 10. In other words, this restricted communicating passage is provided between the slide member 10 and the wall of the inner casing. The passage of fluid through this restricted groove or channel may be regulated by means of the needle valve 17 which extends through the wall portion 4 of the outer casing and is readily accessible from the outside. This needle valve is threaded through the wall 4 and also through the plate 18 which is secured to the outer wall of the inner casing so as to close the opening for the inner end of the valve through the inner casing wall 6. There is provided also, a one-way ball valve 19 in the wall portion 6 of the inner casing so as to permit passage of fluid from the reservoir into the inner casing.

From the above, it will be seen that upon encountering a depression in the roadway, there will be caused a relative rotary motion between the shaft 13 and the casing of the shock absorber, with the result that such rotary motion is transformed into a sliding movement of the plunger 8 which produces compression of the oil or other fluid between the curved oppositely disposed surfaces of the plunger and the wall of the inner casing. The fluid, upon being thus compressed, will be permitted to flow through the restricted passage 16 into the opposite compression chamber, provided the jar which causes such relative motion between the parts is comparatively slow or gentle. When, however, such relative motion is sudden and violent, the sudden compression of fluid within the one chamber will cause a sudden choking of the restricted passage 16, with the result that the fluid will be prevented from passing therethrough. In other words, the parts will be at once locked against such movement by the compression of the fluid within the chamber and the restriction of the fluid in the passage 16. The fluid will then, however, gradually find its way through the restricted passage 16 with the result that the otherwise sudden jolting and jarring movement between the parts is reduced to a gradual and gentle downward movement of the body of the car against the cushion provided by the compression of the fluid. Then when the body of the car would, by virtue of the spring action of the automobile, begin to rise to normal position, the fluid will then begin to be compressed within the other chamber, the reverse relative movement between the arm 11 and the casing, causing the plunger to slide in the opposite direction. The fluid compression which was stored within the one chamber during the downward movement of the body of the car, will now be released and the fluid will be caused by the opposite motion of the plunger to find its way through the restricted passage 16 in the opposite direction. In the same manner as above explained, any sudden return movement upwardly of the body of the car will be prevented by the restriction of the fluid in the passage 16. Since the fluid can pass through the passage 16 only very slowly, the only relative movement permitted between the arm 11 and the casing of the present device will be a very gradual and gentle one. Thus, the otherwise downward movement of the body and also the equally sudden rebound are absorbed by my present form of device which checks such sudden disturbances and reduces them to graduated and gentle movements.

The present form of device is not only efficient in the performance of the function above referred to, but by virtue of its construction, it can be manufactured and sold for use upon the less expensive grades of automobile. This is made possible by the fact that the casing members may be formed from pressed metal, which means a considerable reduction in the cost of manufacture. Another important advantage consists in the utilization of the peripheral or circumferential surfaces for the head walls of the compression chambers, that is, with respect to the rotatable axis which approximately corresponds to the center of such curved surfaces. In other words, for a given degree of relative rotary motion between the parts of my present device, the degree of compression is magnified to a very considerable extent, corresponding approximately to the distance from center to circumference. Furthermore, such magnified degree of compression is utilized on both sides of the plunger so that the same resulting advantage is obtained in connection with both the downward and upward movements of the body of the automobile.

It is to be understood that the present disclosure is merely for purposes of illustration and that the same principle of invention may be embodied in other modified forms of structure, both with respect to design and dimensions. All such modifications are intended to be embraced within the spirit of the present invention as set forth in the following claims.

What I claim as new is:

1. A two-way shock absorber comprising a fluid-containing casing adapted for connection to one part of an automobile having springs between the automobile body and chassis, means within said casing, said casing and means being adapted for relative movement therebetween and having oppositely disposed fluid-compressing curved surfaces upon both sides of said means, and means adapted for connection to another part of an automobile for causing relative movement between said curved surfaces so as to vary the space therebetween and thereby vary the compression of the fluid effectively in both directions.

2. A two-way shock absorber comprising a casing having a cylindrical wall, adapted for connection to one part of an automobile, means arranged within said casing and having a curved outer surface, said means being movable back and forth within and towards and from the cylindrical wall of said casing so as to vary the space therebetween for the two-way compression of a fluid contained within said space, said casing having a fluid reservoir with means of communication therewith, and rotatable means adapted for connection to another part of an automobile for effecting said movement.

3. A two-way shock absorber comprising interengageable members capable of relative back and forth movement therebetween, said members being adapted for connection to a part of an automobile, rotatable means adapted for connection to another part of an automobile for effecting said movement, said members being provided with a fluid chamber therebetween adapted for restriction by said movement so as to cause two-way compression of the fluid in said chamber, a fluid reservoir arranged concentrically about the axis of said rotatable means and having means of communication with said chamber, and the oppositely disposed walls of said chamber being curved substantially about the axis of said rotatable means.

4. A two-way shock absorber comprising a fluid-containing casing adapted for connection to one part of an automobile, means within said casing, said casing and means being adapted for relative back and forth movement therebetween and having adjacent curved surfaces upon both sides of said means, and rotatable means adapted for connection to another part of an automobile for causing relative movement between said curved surfaces so as to vary the space therebetween and thereby vary the fluid pressure, said parts being so constructed and arranged that substantial fluid pressure is effected in both directions.

5. A two-way shock absorber comprising a casing adapted for connection to one part of an automobile, means arranged therein, said casing and means having oppositely disposed curved surfaces upon both sides of said means and affording fluid-containing space therebetween and being relatively movable back and forth so as to vary the fluid compression therebetween in both directions, means adapted for connection to another part of an automobile for effecting said relative movement, and means for preventing sudden relative movement.

6. A shock absorber comprising a cylindrical casing adapted for connection to one part of an automobile, means arranged therein, said casing and means having oppositely disposed curved surfaces upon both sides of said means and affording fluid-containing space therebetween, means adapted for connection to another part of an automobile for effecting said relative movement, and means for varying the compression of the fluid for a given speed of relative movement.

7. A two-way shock absorber comprising a casing adapted for connection to one part of an automobile, means arranged therein and being spaced on opposite sides thereof from said casing so as to provide fluid-containing chambers, said casing and means having oppositely disposed curved surfaces upon both sides of said means and being also relatively movable back and forth so as to cause substantial compression of the fluid alternately in both of said chambers, means adapted for connection to another part of an automobile for effecting said relative movement, and restricted means of communication between said chambers so as to prevent sudden relative movement in either direction.

8. A shock absorber comprising a cylindrical casing adapted for connection to one part of an automobile, means arranged therein and being spaced on opposite sides thereof from said casing so as to provide fluid-containing chambers, said casing and means having oppositely disposed curved surfaces upon both sides of said means and being also relatively movable back and forth so as to cause compression of the fluid alternately in said chambers, means adapted for connection to another part of an automobile for effecting said relative movement, and restricted means of communication between said chambers so as to prevent sudden relative movement.

9. A two-way shock absorber comprising a casing adapted for connection to one part of an automobile, means arranged therein and being spaced on opposite sides thereof from said casing so as to provide fluid-containing chambers, said casing and means having oppositely disposed curved surfaces upon both sides of said means and being also relatively movable back and forth so as to cause substantial compression of the fluid alternately in both of said chambers, means adapted for connection to another part of an automobile for effecting said relative movement.

10. A two-way shock absorber comprising a casing adapted for connection to one part of an automobile, means arranged therein and being spaced on opposite sides thereof from said casing so as to provide fluid-containing chambers, said casing and means being also relatively movable back and forth so as to cause substantial compression of the fluid alternately in said chambers, means adapted for connection to another part of an automobile for effecting said relative movement, and the compression walls of both of said chambers being curved, thereby increasing the degree of compression for a given relative movement therebetween.

11. A two-way shock absorber comprising a casing adapted for connection to one part of an automobile, means arranged therein and being spaced on opposite sides thereof from said casing so as to provide fluid-containing chambers, said casing and means being also relatively movable back and forth so as to cause substantial compression of the fluid alternately in said chambers, means adapted for connection to another part of an automobile for effecting said relative movement, and a restricted means of communication between said chambers, the compression walls of said chambers being curved, and the chambers decreasing in area towards said restricted means of communication.

12. A two-way shock absorber comprising a casing adapted for connection to one part of an automobile, said casing having concave inner end portions, a plunger slidably mounted in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, and rotatable means adapted for connection to another part of an automobile for effecting operation of said plunger.

13. A two-way shock absorber comprising a casing adapted for connection to one part of an automobile, said casing having concave inner end portions, a plunger slidably mounted in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, and means for varying said restricted means of communication.

14. A two-way shock absorber comprising a casing adapted for connection to one part of an automobile, said casing having concave inner end portions, a plunger slidably mounted in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, and means readily accessible from the outside of said casing for varying said restricted means of communication.

15. A two-way shock absorber comprising a casing adapted for connection to one part of an automobile, said casing having concave inner end portions, a plunger mounted for back and forth movement in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, a fluid reservoir associated with said casing, and means for automatically supplying fluid therefrom to said casing.

16. A two-way shock absorber comprising a casing adapted for connection to one part of an automobile, said casing having concave inner end portions, a plunger mounted for back and forth movement in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, a fluid reservoir surrounding said casing, and a one-way valve connection between said reservoir and casing and permitting automatic supply of fluid to one of said chambers.

17. A two-way shock absorber comprising a casing adapted for connection to one part of an automobile, said casing having concave inner end portions, a plunger mounted for back and forth movement in said casing and having convex ends oppositely disposed to and corresponding substantially with said concave inner end portions, the ends of said casing and plunger being spaced from each other so as to provide fluid-compression chambers effective upon movement of said plunger in both directions, a restricted means of communication between said chambers for operation in both directions, and a rotatably mounted arm adapted for connection to another part of an automobile for effecting operation of said plunger, and a ball and socket joint connection between said rotatable arm and said plunger whereby the plunger may be reciprocated by operation of said arm.

18. A two-way shock absorber comprising a casing adapted for connection to one part of an automobile, said casing having curved inner end portions, a plunger slidably mounted in said casing and having curved ends oppositely disposed to and corresponding substantially with the curvature of the ends of said casing, the ends of said casing and plunger being spaced from each other so as to provide fluid-compression chambers effective upon movement of said plunger in both directions, said casing being provided with a groove of restricted cross section affording two-way communication between said chambers, a valve readily accessible from the outside of said casing for controlling the passage through said groove, and rotatable means adapted for connection to another part of an automobile for effecting operation of said plunger.

19. A two-way shock absorber comprising a casing adapted for connection to one part of an automobile, said casing consisting of a plate, an outer casing having an open side secured to said plate, an inner casing having an open side secured to said plate and having its other side parallel with said plate, a plunger mounted for back and forth movement within said inner casing and engaging the said plate and parallel side of said inner casing, a shaft arranged concentrically with respect to said plunger and having operative connection therewith for effecting back and forth movement thereof, and an arm connected to said shaft for rockably operating the same, said arm being adapted for connection to another part of an automobile.

20. A two-way shock absorber comprising a fluid-containing, cylindrical casing adapted for connection to one part of an automobile, means within said casing, said casing and means having oppositely disposed curved surfaces affording fluid-containing space therebetween, said casing and means adapted for relative back and forth movement therebetween in a direction substantially diametrical of said cylindrical casing so as to vary the compression of the fluid therebetween in both directions, and means adapted for connection to another part of an automobile for effecting such relative movement.

21. A two-way shock absorber comprising a cylindrical casing adapted for connection to one part of an automobile, diametrically opposed guide means provided upon the cylindrical wall within said casing, plunger means adapted for reciprocating movement between and in engagement with said guide means and having curved surfaces oppositely disposed to the curved wall of the said cylindrical casing so as to afford two-way fluid-compressing space therebetween, and means adapted for operative connection to another part of an automobile for effecting such relative movement.

22. A shock absorber comprising a casing adapted for connection to one part of an automobile or the like, said casing having oppositely disposed curved surfaces, said casing comprising a fluid reservoir and an inner chamber, plunger means arranged in said inner chamber and being spaced on opposite sides thereof from said inner chamber so as to provide separate fluid-compression compartments with curved surfaces for co-operation with said plunger means, said casing having means of communication between said compartments, and valve means accessible from the outside of said casing for regulating such communication between the compartments.

In testimony whereof, I hereby affix my signature.

STEPHEN JENCICK.